(12) United States Patent
Mildner

(10) Patent No.: US 8,297,687 B2
(45) Date of Patent: Oct. 30, 2012

(54) VEHICLE BODY FOR A MOTOR VEHICLE

(75) Inventor: Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 12/571,057

(22) Filed: Sep. 30, 2009

(65) Prior Publication Data

US 2010/0084891 A1 Apr. 8, 2010

(30) Foreign Application Priority Data

Sep. 30, 2008 (DE) .......................... 10 2008 049 763

(51) Int. Cl.
*B62D 25/08* (2006.01)
(52) U.S. Cl. ..................... 296/192; 296/203.02; 296/208
(58) Field of Classification Search .................. 296/192, 296/193.09, 203.02, 208, 29, 30
See application file for complete search history.

(56) References Cited

U.S. PATENT DOCUMENTS

| | | | | |
|---|---|---|---|---|
| 3,788,681 A * | 1/1974 | Barenyi et al. | ................ | 296/192 |
| 4,353,430 A * | 10/1982 | Sjoqvist et al. | ................ | 180/90 |
| 4,753,475 A * | 6/1988 | Mochida | ....................... | 296/192 |
| 4,883,309 A * | 11/1989 | Miyazaki et al. | ........ | 296/193.09 |
| 4,976,491 A * | 12/1990 | Hashimoto et al. | ............ | 296/192 |
| 5,417,471 A * | 5/1995 | Kreis et al. | ............... | 296/203.02 |
| 6,260,914 B1 * | 7/2001 | Nieminski et al. | ....... | 296/190.08 |
| 6,322,440 B1 * | 11/2001 | Nakatani | ....................... | 454/147 |
| 6,338,525 B1 * | 1/2002 | Benz et al. | ............... | 296/203.02 |
| 6,361,102 B1 * | 3/2002 | Han | ......................... | 296/203.02 |
| 6,591,927 B1 * | 7/2003 | Honekamp et al. | ............. | 180/90 |
| 6,633,089 B2 * | 10/2003 | Kimura | ......................... | 307/10.1 |
| 6,869,134 B2 * | 3/2005 | Kato et al. | ..................... | 296/192 |
| 6,883,628 B1 * | 4/2005 | Mizukami et al. | ............. | 180/90 |
| 7,066,533 B2 * | 6/2006 | Sohmshetty et al. | ..... | 296/203.02 |
| 7,357,446 B2 * | 4/2008 | Sakai et al. | ................... | 296/192 |
| 7,540,557 B2 * | 6/2009 | Shimura | ....................... | 296/192 |
| 7,766,420 B2 * | 8/2010 | Maruyama et al. | ....... | 296/203.02 |
| 7,845,716 B2 * | 12/2010 | Kiyotake et al. | ......... | 296/203.02 |
| 7,854,473 B2 * | 12/2010 | Kuroita et al. | ........... | 296/203.02 |
| 7,887,123 B2 * | 2/2011 | Honji et al. | .............. | 296/187.09 |
| 2003/0107243 A1 * | 6/2003 | Hayashi | ....................... | 296/192 |
| 2008/0116721 A1 * | 5/2008 | Shimura | ....................... | 296/192 |

FOREIGN PATENT DOCUMENTS

| | | |
|---|---|---|
| DE | 4424288 A1 | 1/1996 |
| DE | 19813094 A1 | 9/1999 |
| EP | 0304366 A1 | 2/1989 |

OTHER PUBLICATIONS

German Patent Office, German Search Report for Application No. 102008049763.0 dated Aug. 8, 2009.

* cited by examiner

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

In a vehicle body for a motor vehicle, a crossbeam is situated between two longitudinal girders of a front frame. The crossbeam is formed from the vehicle front wall, the cover plate and the bulkhead plate. The bulkhead plate is led up to a plate of a wheel arch laterally outside the longitudinal girders. The vehicle body thus has a particularly high stability at a low weight.

19 Claims, 5 Drawing Sheets

VEHICLE BODY FOR A MOTOR VEHICLE

CROSS-REFERENCE TO RELATED APPLICATION

This application claims priority to German Patent Application No. 102008049763.0, filed Sep. 30, 2008, which is incorporated herein by reference in its entirety.

TECHNICAL FIELD

The invention relates to a vehicle body for a motor vehicle having a front wall, which delimits a passenger compartment in the travel direction, having a water chamber fastened to the front wall, and having longitudinal girders of a front frame guided laterally from the floor area of the passenger compartment through below the front wall, the water chamber being delimited by the front wall and a bulkhead plate fastened to the front wall.

BACKGROUND

A vehicle body is known, for example, from DE 44 24 288 A1. In this vehicle body, the water chamber is situated at the uppermost boundary of the front wall directly below a front windshield of the motor vehicle. The bulkhead plate delimiting the water chamber in the travel direction connects two suspension strut top mounts situated on both sides of the vehicle body. This design of the vehicle body has the disadvantage that situating a large number of components of the motor vehicle, such as ventilation or the hose connection of the air-conditioning system, the reservoir containers of the windshield cleaning system, the fuse box, the vehicle battery, etc., in the installation space formed by the water chamber proves to be very difficult. Therefore, it is known from practice that because of the small water chamber volume, these assemblies are partially situated in the engine compartment, which causes packaging problems and has a negative influence on the installation and removal of the components. In case of a crash, the required free deformation length of the vehicle body structure is reduced in this way by blocking of the components. Furthermore, the vehicle body requires cross beams for stiffening the front wall, which delimit further installation space in the travel direction in front of the front wall and contribute to further increasing the weight.

The invention is based on the at least one object of refining a vehicle body of the type cited at the beginning so that it has a particularly low weight with high stability of the front wall.

SUMMARY

This problem is solved according to the invention in that the bulkhead plate of the water chamber connects the longitudinal girders to one another and is implemented having a cover plate as a crossbeam.

Through this design, the water chamber is situated low and thus close to the floor of the vehicle body according to the invention and forms a crossbeam with the cover plate. The water chamber thus contributes to a particularly high rigidity of the vehicle body according to the invention at a low weight. Furthermore, the area of the front wall in which the water chamber is situated according to embodiments of the invention offers additional installation space for functional components of the motor vehicle, such as ventilation, air-conditioning system, or the like. Through the configuration of the water chamber at the height of the longitudinal girders, the possibility suggests itself of situating the crossbeam profile directly on the water chamber. Thanks to the embodiments of the invention, the front wall may be reinforced easily like a frame, the lower crossbeam and A columns forming the lateral reinforcements for the water chamber. The bulkhead plate is preferably welded directly to the longitudinal girders.

According to another advantageous embodiment of the invention, the water chamber has a particularly simple design if the cover plate delimits the water chamber on the bottom.

Draining of water through the water chamber may be ensured according to another advantageous embodiment of the invention if the cover plate and the bulkhead wall each delimit at least one water drain formed by an opening.

According to another advantageous embodiment of the invention, it contributes to increasing the stability of the water chamber formed by the crossbeam if the cover plate has an array of beads and if the beads are situated in the travel direction of the motor vehicle. The orientation of the beads of the cover plate in the travel direction has the advantage that the cross section of the crossbeam is largely maintained in the event of a crash of the motor vehicle. The stiffening of the crossbeam transversely to the travel direction can be generated by a corresponding profiling of the bulkhead plate in its longitudinal direction.

According to another advantageous embodiment of the invention, penetration of water between the cover plate and an adjoining plate may be avoided easily if flanges of the cover plate are angled upward for attachment to adjoining plates. Furthermore, the installation of the cover plate is made easier in this way, because its flanges are easily accessible for placing a welding tool, for example.

A reinforcement of the front frame which is situated particularly low may be generated easily according to another advantageous embodiment of the invention if the bulkhead plate is fastened between the longitudinal girders in the lower half of the front wall.

The reinforcement of the front wall formed by the water chamber is guided further laterally outside the front frame according to another advantageous embodiment of the invention if the water chamber, viewed from the vehicle center, is laterally delimited outside the longitudinal girders by the front wall and a plate of a wheel arch. Through this design, the crossbeam is led over the entire width of the front wall and thus results in a particularly high rigidity of the passenger compartment. In this way, the vehicle body according to embodiments of the invention has particularly high safety in the event of a crash of the motor vehicle. The plate of the wheel arch can be a suspension strut top mount which projects above the wheel arch, for example.

According to another advantageous embodiment of the invention, it contributes to further stiffening the delimitation of the passenger compartment pointing in the travel direction if the bulkhead plate is fastened on the plate of the wheel arch. The attachment of the crossbeam to adjoining areas of the vehicle body thus has particularly high rigidity. This contributes to high safety of the vehicle body in the event of a crash.

It contributes to simplifying the installation of the vehicle body if the water chamber has two bulkhead plate parts, if each of the bulkhead plate parts is connected to a single one of the longitudinal girders, and if the two bulkhead plate parts are connected to one another between the longitudinal girders. Through this design, the bulkhead plate parts may each be preassembled with one longitudinal girder. The bulkhead plate parts are connected to one another upon the connection of the front frame to the front wall. The bulkhead plate parts preferably have welding flanges for their connection. If it is advantageous for reasons of the assembly sequence of the vehicle body according to the invention, the bulkhead plate can also have three bulkhead plate parts having two lateral parts and a middle part.

Preparation of the vehicle body according to embodiments of the invention for right-hand and left-hand drive motor vehicles has a particularly simple design according to an advantageous embodiment of the invention if the bulkhead plate has two steering passages and if one of the steering passages is closed by a plastic plug. The plastic plug is preferably provided with expanding foam, which cures upon a passage of the vehicle body through a drying furnace and seals off the steering passage to the passage of water.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
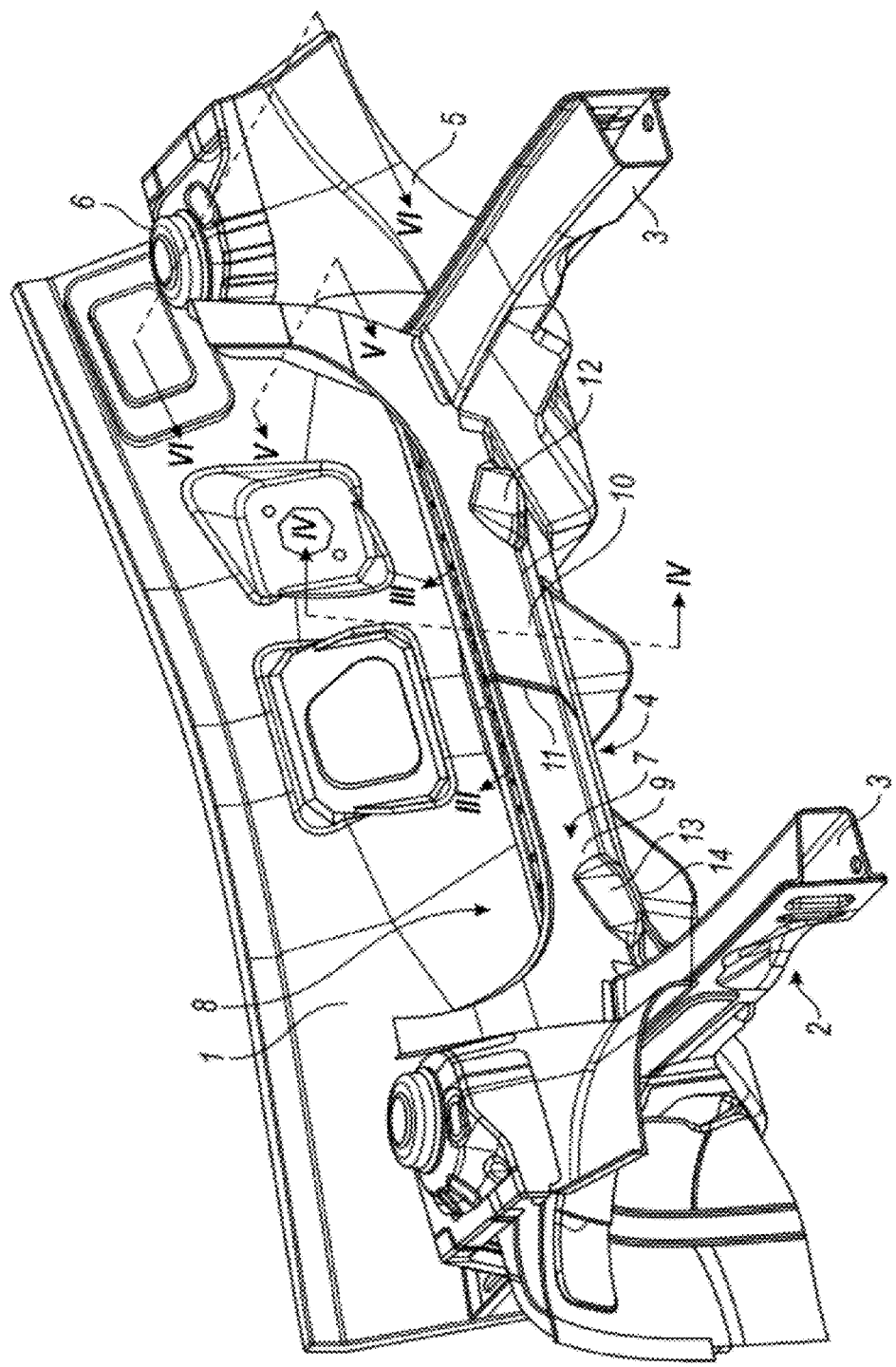
FIG. 1 shows a perspective view of a subarea of a vehicle body according to the invention having a front frame and having a front wall.

FIG. 1 shows a subarea of a vehicle body having a front wall 1, which delimits a passenger compartment in the travel direction, and having a front frame 2. The travel direction is identified by an arrow for clarification in FIG. 1. The front frame 2 has two lateral longitudinal girders 3, which point in the travel direction, and a crossbeam 4 situated on the front wall 1. Plates 5 of a wheel arch and suspension strut top mounts 6 are situated laterally outside the longitudinal girders 3. The crossbeam 4 has a bulkhead plate 7 fastened to the front wall 1. The bulkhead plate 7 is implemented together with the front wall as a water chamber 8. The bulkhead plate 7 is led up to the plate 5 of the wheel arch and fastened thereon. Furthermore, FIG. 1 shows that the bulkhead plate 7 has two bulkhead plate parts 9, 10, which are connected to one another in the vehicle center. The bulkhead plate parts 9, 10 have a common flange 11, at which they are fastened to one another. A total of two steering passages 12, 13 are situated in the bulkhead plate parts 9, 10 for the passage of a steering unit (not shown). One of the steering passages 13 is closed using a plastic plug 14 (schematically shown).

Figure 2:
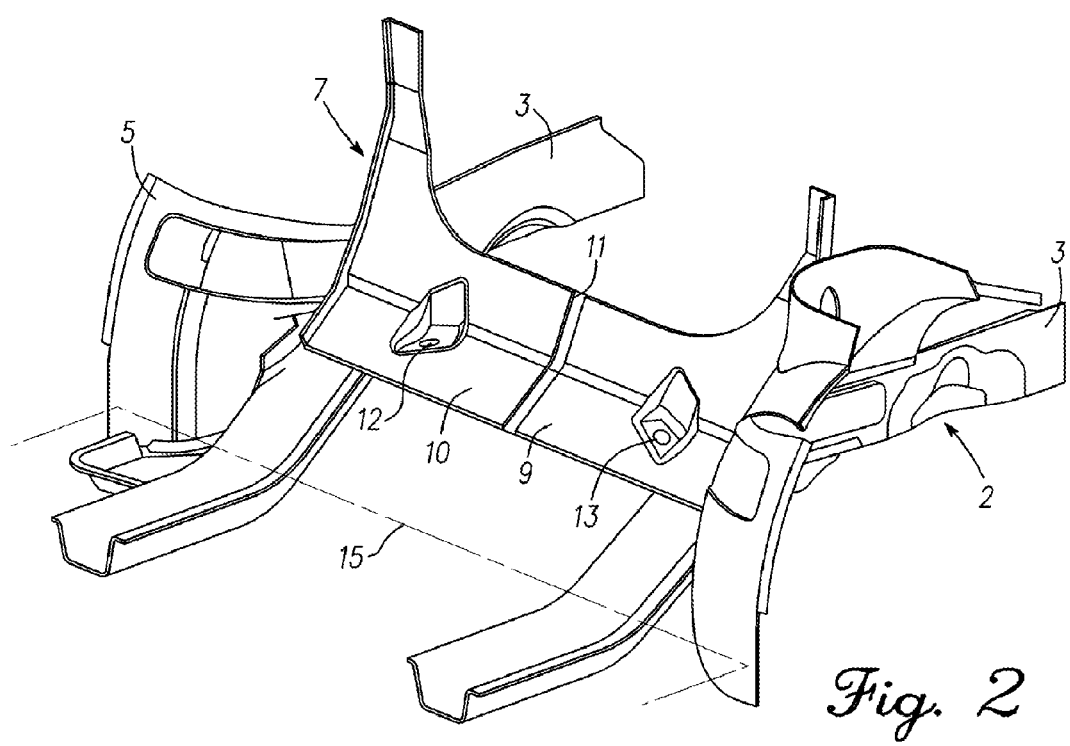
FIG. 2 shows the front frame from FIG. 1 before the installation of the front wall.

FIG. 2 shows, in a view from the passenger compartment of the motor vehicle of the front frame 2 of the vehicle body from FIG. 1, that the longitudinal girders 3 are led up to a floor plate 15, which is shown by dot-dash lines. For illustration, the front wall 1 and the suspension strut top mounts 6 from FIG. 1 are not shown. The travel direction of the motor vehicle is identified by an arrow. The bulkhead plate 7 is situated slightly above the lower end of the front wall 1 or the floor plate 15.

Figure 3:
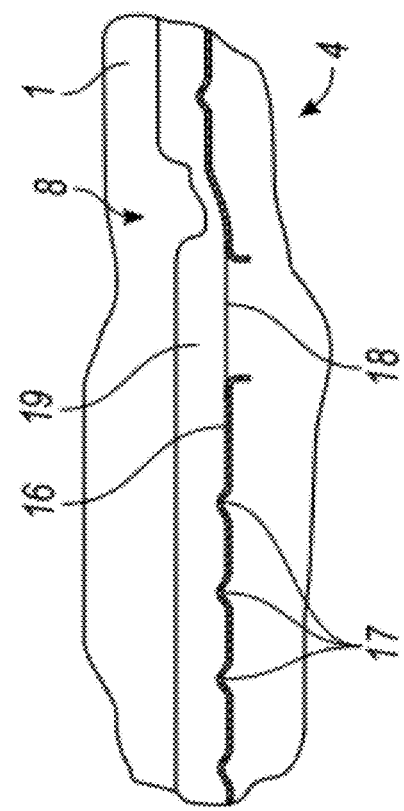
FIG. 3 shows an enlarged sectional illustration through a cover plate of the water chamber of the vehicle body from FIG. 1 along line III-III.

FIG. 3 shows the upper area of the crossbeam 4 from FIG. 1 along line III-III in an enlarged sectional illustration. The water chamber 8 of the front wall is delimited on the bottom by a cover plate 16. The cover plate 16 has beads 17, which point in the travel direction and thus perpendicularly to the plane of the drawing, for reinforcement, and one or more openings 18 as a water drain. The cover plate 16 is fastened to the front wall 1 using a flange 19, which points upward.

Figure 4:
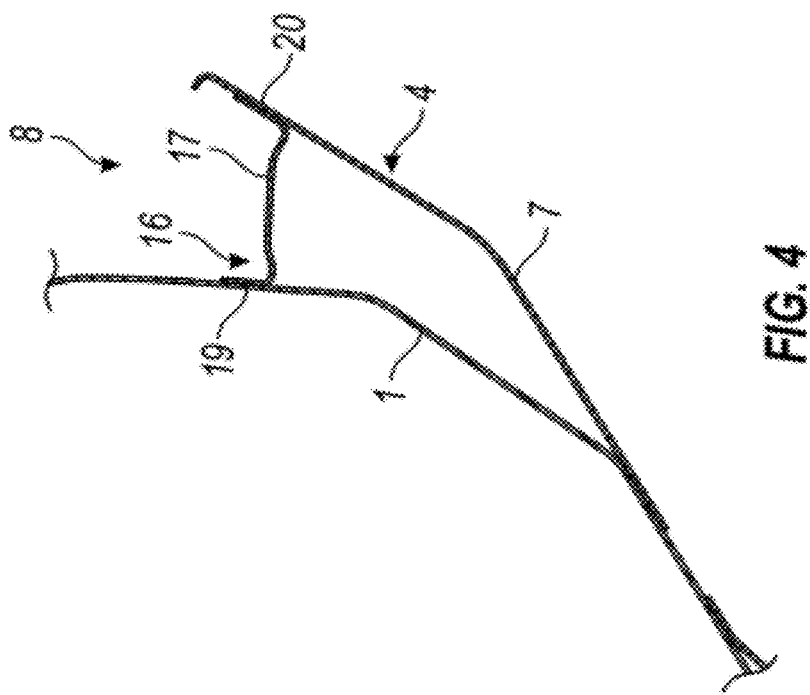
FIG. 4 shows an enlarged sectional illustration through a central area of the water chamber of the vehicle body from FIG. 1 along line IV-IV.

As FIG. 4 shows in a sectional illustration through the crossbeam 4 from FIG. 1 along line IV-IV, the cover plate 16 has a second flange 20 pointing upward for fastening on the bulkhead plate 7. The beads 17 are situated between the flanges 19, 20. In addition, it can be seen in FIG. 4 that the lower end of the bulkhead plate 7 is connected to the front wall 1. Drain openings (not shown) for draining the water collected in the water chamber 8 are each situated laterally close to the longitudinal girder 3 at the lowest point of the bulkhead plate 7.

Figure 5:
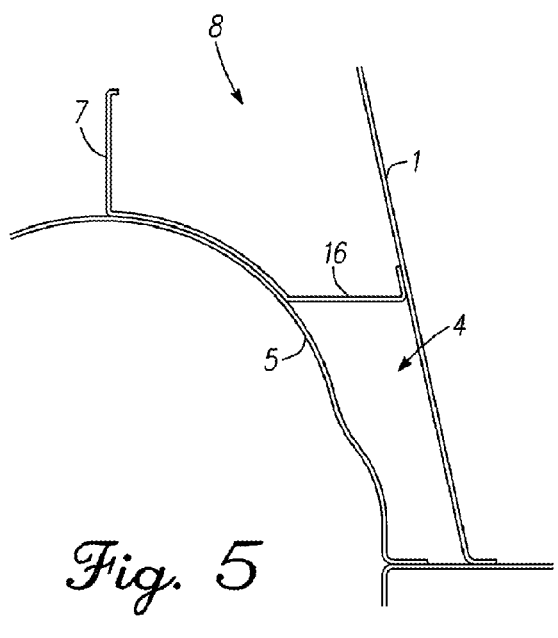
FIG. 5 shows an enlarged sectional illustration through a lateral area of the water chamber of the vehicle body from FIG. 1 along line V-V.

FIG. 5 shows, in a sectional illustration through the vehicle body from FIG. 1 along line V-V, that the water chamber 8 is led up to the plate 5 of the wheel arch. The bulkhead plate 7 is also fastened on the plate 5 of the wheel arch. The cover plate 16 is fastened at this position, which is shown laterally outside the longitudinal girder 3, to the front wall 1 and the plate 5 of the wheel arch.

Figure 6:
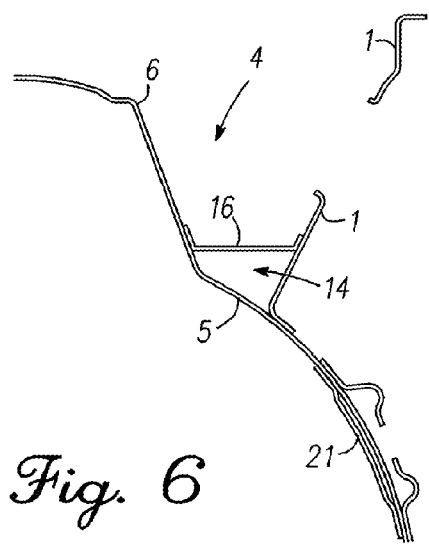
FIG. 6 shows an enlarged sectional illustration through a cover plate of a water chamber of the vehicle body from FIG. 1 along line VI-VI.

FIG. 6 shows, in a sectional illustration through the vehicle body from FIG. 1 along line VI-VI, that the crossbeam 4 is led close to the suspension strut top mount 6. The suspension strut top mount 6 is welded to the plate 5 of the wheel arch directly above the crossbeam 4. Furthermore, FIG. 6 shows that a closing plate 21 of the front frame 2 shown in FIG. 1 is fastened laterally outside the longitudinal girder 3 to the plate 5 of the wheel arch.

Figure 7:
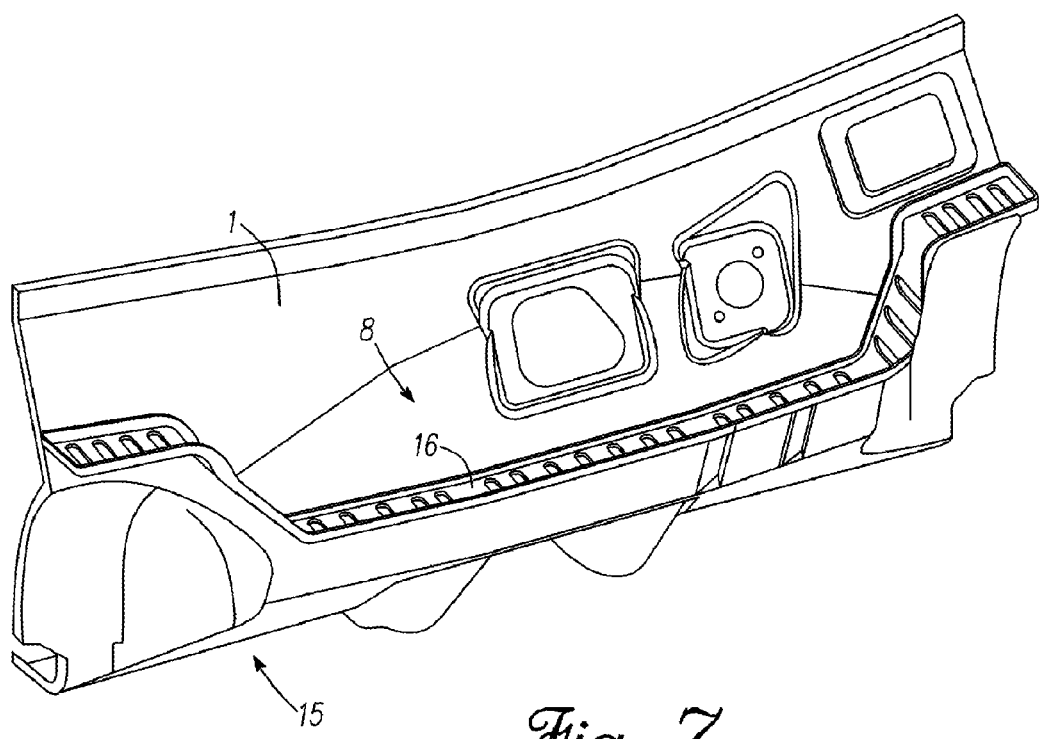
FIG. 7 shows a perspective view of the front wall having the crossbeam.

FIG. 7 shows in a perspective view that the crossbeam 4 is situated close to the lower area of the front wall 1 and thus closes to the floor plate 15.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle body for a motor vehicle, comprising:
   a front wall that delimits a passenger compartment in a travel direction;
   a cover plate comprising an array of beads oriented in the travel direction;
   a water chamber fastened to and delimited by the front wall, the water chamber connected to at least two longitudinal girders of a front frame that point in the travel direction and extend from a floor area of the passenger compartment below the front wall; and
   a bulkhead plate of the water chamber fastened to the front wall, the bulkhead plate coupling the at least two longitudinal girders and implemented with the cover plate as a crossbeam.

2. The vehicle body according to claim 1, wherein the cover plate delimits the water chamber on the bottom.

3. The vehicle body according to claim 2, wherein the cover plate and the bulkhead plate delimit at least one water drain formed by an opening.

4. The vehicle body according to claim 2, wherein a flange of the cover plate is angled upward for attachment to adjoining plates.

5. The vehicle body according to claim 1, wherein the bulkhead plate is fastened between the at least two longitudinal girders in the lower half of the front wall.

6. The vehicle body according to claim 1, wherein the cover plate is delimited, viewed from a vehicle center, laterally outside the at least two longitudinal girders by the front wall and a plate of a wheel arch.

7. The vehicle body according to claim 1, wherein the bulkhead plate is fastened to a plate of a wheel arch.

8. The vehicle body according to claim 1, wherein the water chamber comprises at least two bulkhead plate parts, each of the at least two bulkhead plate parts connected to a single one of the at least two longitudinal girders.

9. The vehicle body according to claim 1, wherein the bulkhead plate comprises at least two steering passages, and one of the at least two steering passages is closed by a plastic plug.

10. A vehicle body for a motor vehicle, comprising:
   a cover plate comprising an array of beads situated in the travel direction;
   a front wall that delimits a passenger compartment in a travel direction;
   a water chamber fastened to and delimited by the front wall, the water chamber connected to at least two longitudinal girders of a front frame that point in the travel direction extending from a floor area of the passenger compartment through the front wall and; and
   a bulkhead plate of the water chamber comprising two bulkhead plate parts fastened to the front wall and the cover plate which is configured as a cross beam, the bulkhead plate coupling the at least two longitudinal girders.

11. The vehicle body according to claim 10, wherein the cover plate is delimited, viewed from a vehicle center, laterally outside the at least two longitudinal girders by the front wall and a plate of a wheel arch.

12. The vehicle body according to claim 10, wherein the bulkhead plate comprises at least two steering passages, and one of the at least two steering passages is closed by a plastic plug.

13. The vehicle body according to claim 10, wherein the cover plate delimits the water chamber on the bottom.

14. A vehicle body for a motor vehicle, comprising:
   a cover plate;
   a front wall that delimits a passenger compartment in a travel direction;
   a water chamber that is fastened to and delimited by the front wall, the water chamber connected to at least two longitudinal girders of a front frame that point in the travel direction and extend from a floor area of the passenger compartment through and below the front wall; and
   a bulkhead plate of the water chamber comprising at least two steering passages and fastened to the front wall, the bulkhead plate coupling the at least two longitudinal girders and implemented with the cover plate as a crossbeam, wherein one of the at least two steering passages is closed by a plastic plug.

15. The vehicle body according to claim 14, wherein the cover plate comprises an array of beads and the array of beads are situated in the travel direction.

16. The vehicle body according to claim 14, wherein the water chamber comprises at least two bulkhead plate parts, each of the at least two bulkhead plate parts connected to a single one of the at least two longitudinal girders.

17. The vehicle body according to claim 14, wherein the cover plate is delimited, viewed from a vehicle center, laterally outside the at least two longitudinal girders by the front wall and a plate of a wheel arch.

18. The vehicle body according to claim 14, wherein the cover plate delimits the water chamber on the bottom.

19. The vehicle body according to claim 18, wherein a flange of the cover plate is angled upward for attachment to adjoining plates.

* * * * *